(12) United States Patent
Schumacher

(10) Patent No.: US 10,974,677 B2
(45) Date of Patent: Apr. 13, 2021

(54) ENERGY SUPPLY DEVICE FOR AN OCCUPANT PROTECTION SYSTEM

(71) Applicant: Robert Bosch GmbH, Stuttgart (DE)

(72) Inventor: Hartmut Schumacher, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 120 days.

(21) Appl. No.: 16/306,064

(22) PCT Filed: May 11, 2017

(86) PCT No.: PCT/EP2017/061387
§ 371 (c)(1),
(2) Date: Nov. 30, 2018

(87) PCT Pub. No.: WO2017/207242
PCT Pub. Date: Dec. 7, 2017

(65) Prior Publication Data
US 2019/0161043 A1    May 30, 2019

(30) Foreign Application Priority Data
Jun. 2, 2016 (DE) .......................... 102016209653.2

(51) Int. Cl.
*B60L 1/00* (2006.01)
*B60R 21/017* (2006.01)
(Continued)

(52) U.S. Cl.
CPC ............ *B60R 21/017* (2013.01); *G05F 1/462* (2013.01); *H02J 7/34* (2013.01); *H02J 7/345* (2013.01);
(Continued)

(58) Field of Classification Search
CPC ....... B60R 21/017; H02M 3/156; H02J 7/345; H02J 7/007; H02J 7/34; H02J 9/06; H02J 9/061; G05F 1/462
See application file for complete search history.

(56) References Cited

U.S. PATENT DOCUMENTS 5,506,775 A    4/1996  Tsurushima et al.
2002/0180268 A1* 12/2002 Mattes .................... H02J 7/345
                                          307/9.1
(Continued)

FOREIGN PATENT DOCUMENTS

EP    2871307 A1    5/2015
JP    2005328646 A  11/2005
(Continued)

OTHER PUBLICATIONS

International Search Report for PCT/EP2017/061387, dated Aug. 17, 2017.

*Primary Examiner* — Jared Fureman
*Assistant Examiner* — Esayas G Yeshaw
(74) *Attorney, Agent, or Firm* — Norton Rose Fulbright US LLP; Gerard Messina

(57) ABSTRACT

An energy supply device for an occupant protection system is described, including an ignition energy supply device and a back-up supply device, the ignition energy supply device including an ignition energy store, which is chargeable via a first charge circuit from a first system voltage to a reserve voltage, the ignition energy store being suitable for providing a high ignition energy in the range of 0.1 kW to 2.5 kW (Continued)

for at least one restraint means for a short time period of 0.5 ms to 2 ms. The back-up supply device includes a back-up energy store, which is chargeable via a second charge circuit from a system voltage to a back-up voltage, the back-up energy store having an energy density value higher than the ignition energy store by a factor of 10 to 50 and being suitable for providing the supply energy in the range of 1 W to 10 W for the passenger protection system in the event of a supply interruption for a predefined time period of at least 5 s.

12 Claims, 4 Drawing Sheets

(51) Int. Cl.
    *H02J 7/34*     (2006.01)
    *H02J 9/06*     (2006.01)
    *G05F 1/46*     (2006.01)
    *H02J 7/00*     (2006.01)
    *H02M 3/156*     (2006.01)

(52) U.S. Cl.
    CPC ............... *H02J 9/06* (2013.01); *H02J 9/061* (2013.01); *H02J 7/007* (2013.01); *H02M 3/156* (2013.01)

(56) References Cited

U.S. PATENT DOCUMENTS

| | | | |
|---|---|---|---|
| 2003/0101961 A1* | 6/2003 | Foster | F01N 3/0885 123/198 F |
| 2009/0212544 A1* | 8/2009 | Schumacher | H02J 7/345 280/735 |
| 2010/0251996 A1* | 10/2010 | Akimoto | B60K 6/445 123/406.23 |
| 2012/0235495 A1* | 9/2012 | Eggert | H02J 7/345 307/80 |
| 2012/0313586 A1* | 12/2012 | Signorelli | B82Y 30/00 320/128 |
| 2017/0009667 A1* | 1/2017 | Asami | F02D 13/0269 |
| 2018/0309312 A1* | 10/2018 | King | H02J 7/0068 |

FOREIGN PATENT DOCUMENTS

| | | |
|---|---|---|
| JP | 2008006996 A | 1/2008 |
| JP | 2008168691 A | 7/2008 |
| JP | 2009508743 A | 3/2009 |
| WO | 0192066 A1 | 12/2001 |
| WO | 2007003469 A2 | 1/2007 |
| WO | 2010149465 A1 | 12/2010 |

\* cited by examiner

ENERGY SUPPLY DEVICE FOR AN OCCUPANT PROTECTION SYSTEM

FIELD OF THE INVENTION

The present invention is directed to an energy supply device for an occupant protection system.

BACKGROUND INFORMATION

Energy supply devices for occupant protection systems are known from the related art, which are designed as airbag systems, for example, and have an ignition energy supply device, which includes at least one ignition energy store preferably designed as an aluminum electrolyte capacitor. The at least one ignition energy store may be charged via a first charge circuit from a first system voltage to a reserve voltage. On the one hand, such an ignition energy store provides a high ignition power in the range of 0.1 kW to 1.5 kW for at least one restraint means for a short time period of 0.5 ms to 2 ms. On the other hand, these known ignition energy stores provide the supply power in the range of 1 W to 10 W in the event of a supply interruption for a short time period of 100 ms to 2500 ms. The ignition energy stores designed as aluminum electrolyte capacitors are only conditionally suitable for a longer provision time in the event of a supply interruption of 5 s to 60 s for the coverage of multiple crash events and for the storage of large data volumes and more comprehensive crash data in the form of driving data prior to, during and after a crash.

SUMMARY

The energy supply device for an occupant protection system has the advantage that the higher energy density of the back-up energy store allows the autonomy times to be extended beyond 5 s compared to the conventional ignition energy stores, with the same volume requirement. It is also possible to expand the system functionality with respect to the sensor system, emergency functions, extended communication connection and the like having a higher energy demand. Specific embodiments of the present invention advantageously allow average autonomy times in the range of 5 s to 60 s to cover multiple crash events. Moreover, requirements regarding the storage of large data volumes, such as driving data prior to, during and after a crash, may be met. Furthermore, the detection and storage of more comprehensive crash data, such as accelerations along the three spatial directions and rotation rates about the three spatial axes, may be supported.

The previously used ignition energy stores may be designed in such a way in specific embodiments of the present invention that only the energy necessary for the activation of restraint means is still provided. This advantageously reduces the size of these energy stores.

Specific embodiments of the present invention make an energy supply device for an occupant protection system available, which includes an ignition energy supply device and a back-up supply device. The ignition energy supply device includes an ignition energy store which is chargeable via a first charge circuit from a first system voltage to a reserve voltage. The ignition energy store is suitable for providing a high ignition power in the range of 0.1 kW to 1.5 kW for at least one restraint means for a short time period of 0.5 ms to 2 ms. The back-up supply device includes a back-up energy store, which is chargeable via a second charge circuit from a system voltage to a back-up voltage. The back-up energy store has an energy density value higher than the ignition energy store by a factor of 10 to 50 and is suitable for providing the supply power in the range of 1 W to 10 W for the occupant protection system in the event of a supply interruption for a predefined time period of at least 5 s.

A back-up supply device is presently understood to mean an assembly which provides the supply energy for the occupant protection system in the event of a supply interruption for a predefined autonomy time period. Moreover, the back-up supply device includes a charge circuit for charging the back-up energy store.

It is particularly advantageous that the ignition energy store may include at least one aluminum electrolyte capacitor. The back-up energy store may include at least one electric double layer capacitor (EDLC) having an energy density value higher by a factor of 10 to 50 compared to an aluminum electrolyte capacitor. This higher energy density allows the autonomy times to be extended beyond 5 s compared to aluminum electrolyte capacitors, with the same volume requirement. It is also possible to expand the system functionality having a higher power requirement. The task of the ignition energy storage is not administered by an EDLC since it is difficult to provide the required high powers of up to 1.5 kW for short time periods, especially in the cold. The back-up energy store, for example, may include at least two electric double layer capacitors connected in series and/or at least two electric double layer capacitors connected in parallel. Moreover, a combination of such series circuits and/or parallel circuits of electric double layer capacitors is also possible to further improve the back-up supply.

In one advantageous embodiment of the energy supply device according to the present invention, a step-up converter may convert an input voltage to a higher output voltage, which corresponds to the first system voltage. The step-up converter may generate a constant higher system voltage in the range of 20 V to 40 V, for example, from different vehicle voltages in the range of 6 V to 18 V. The first charge circuit may then charge the ignition energy store from this first system voltage. The charge current is preferably programmable via an SPI. Moreover, a step-down converter may be provided, which converts the first system voltage into a lower output voltage, which corresponds to a second system voltage. This means that the first system voltage may be used for the direct supply of the step-down converter, which generates the lower second system voltage in the range of 6.7 V to 7.5 V therefrom. This second system voltage may be used to supply an external PSI standard sensor interface and downstream further voltage regulators. In this way, for example, at least one voltage regulator may regulate the second system voltage to an internal supply voltage, so that internal analog and/or digital and/or switched voltages may be provided for the occupant protection system.

In one further advantageous embodiment of the energy supply device according to the present invention, an evaluation and control unit may set a first charge current for the ignition energy store via the first charge circuit and/or a second charge current for the back-up energy store via the second charge circuit as a function of at least one piece of system information. In addition or as an alternative, the evaluation and control unit may set a conversion factor of the step-up converter and/or a level of the first system voltage as a function of at least one piece of system information. The at least one piece of system information may, for example, include a piece of information about an instantaneous value of the vehicle voltage and/or a piece of information about an instantaneous value of a polarity reversal-protected vehicle voltage and/or a piece of information about an instantaneous value of the first system voltage and/or a piece of information about an instantaneous value of the back-up voltage.

The evaluation and control unit may presently be understood to mean an electrical device, such as a control unit, for example, in particular an airbag control unit, which processes or evaluates detected sensor signals. The evaluation and control unit may have at least one interface which may be designed as hardware and/or software. In the case of a hardware design, the interfaces may, for example, be part of a so-called system ASIC which includes a wide variety of functions of the evaluation and control unit. However, it is also possible for the interfaces to be separate integrated circuits, or to be at least partially made up of discrete elements. In the case of a software design, the interfaces may be software modules which are present on a microcontroller, for example, in addition to other software modules. In addition, a computer program product is advantageous, having program code which is stored on a machine-readable carrier such as a semiconductor memory, a hard disk memory or an optical memory, and which is used to carry out the evaluation if the program is executed by the evaluation and control unit.

In one further advantageous embodiment of the energy supply device according to the present invention, the second charge circuit may be connected at a first charge point to the first system voltage, or at a second charge point to the vehicle voltage, or at a third charge point to the second system voltage. The first charge point and the first system voltage are excellently suited for charging the at least one back-up energy store designed as an electric double layer capacitor with a limited charge current and to maintain it at its nominally permissible voltage, regardless of the vehicle voltage. The second charge point and the vehicle voltage are also well-suited for charging a back-up energy store based on electric double layer capacitors. The third charge point and the second system voltage are of interest for optionally docking a back-up energy store based on electric double layer capacitors to an existing occupant protection system.

In one further advantageous embodiment of the energy supply device according to the present invention, the back-up energy store may provide the polarity reversal-protected vehicle voltage at a first feed point, or the second system voltage at a second feed point, or the first system voltage at a third feed point, in the event of a supply interruption. The evaluation and control unit may preferably connect the back-up energy store via a back-up switch to a corresponding feed point as a function of at least one piece of system information. The first feed point is suited the best for connecting a back-up energy store based on electric double layer capacitors to a lower output voltage in the range of 1 V to a maximum of n×2.7 V (n=3 to 6) in such a way that the suitable second system voltage may be generated therefrom via the step-up converter. The second feed point is suitable when the functions to be maintained only require a low supply voltage of 3.3 V or less. The third feed point is suitable for back-up energy stores based on electric double layer capacitors including at least six electric double layer capacitors in order to provide a high supply voltage of more than 12 V.

Exemplary embodiments of the present invention are shown in the drawings and are described in greater detail in the following description. In the drawings, identical reference symbols denote components or elements which carry out the same or analogous functions.

DETAILED DESCRIPTION

Figure 1:
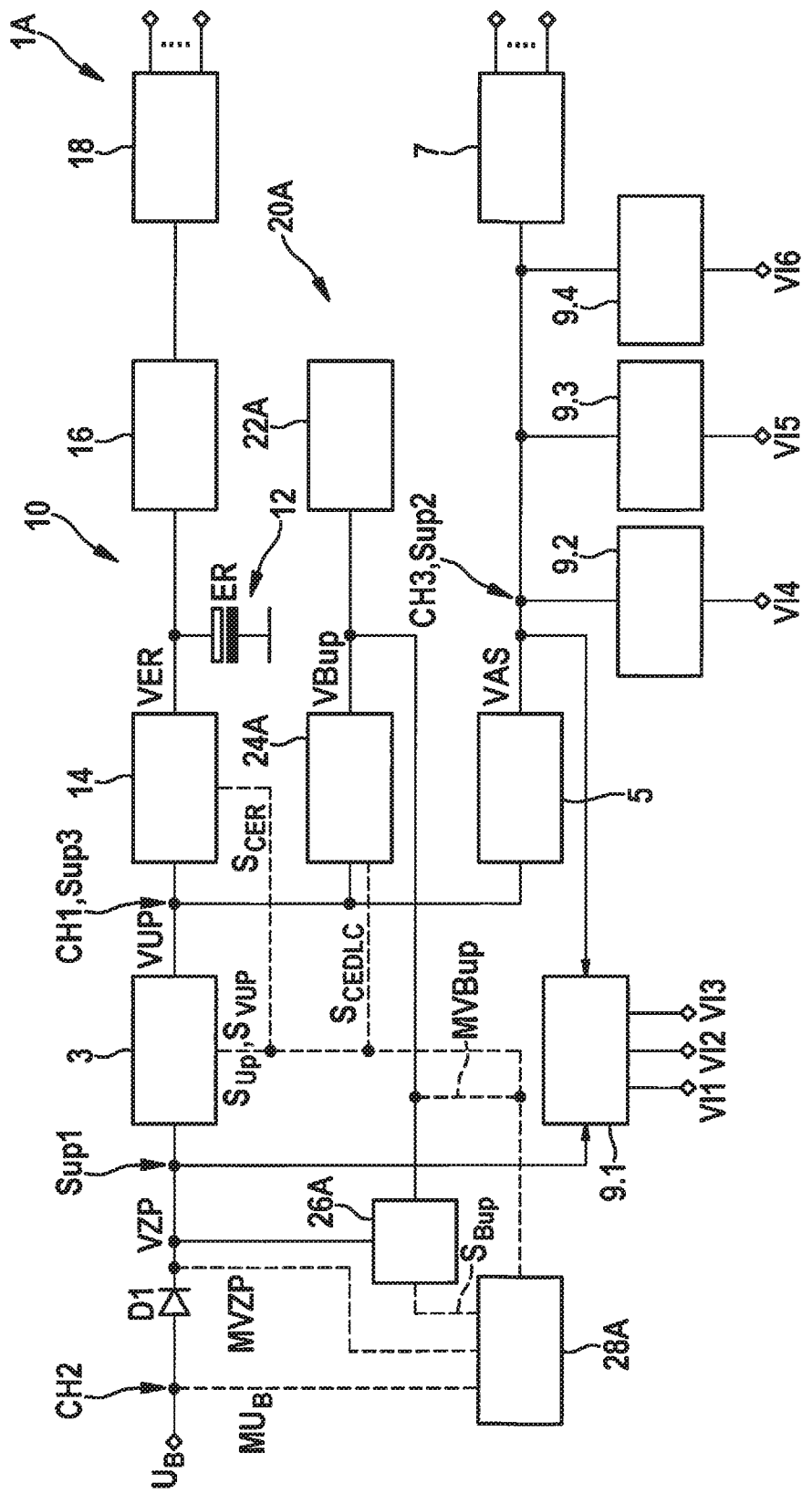
FIG. 1 shows a schematic block diagram of a first exemplary embodiment of an energy supply device according to the present invention for an occupant protection system.

As is apparent from FIGS. 1 through 5, the shown exemplary embodiments of an energy supply device 1A, 1B according to the present invention for an occupant protection system each include an ignition energy supply device 10 and a back-up supply device 20A, 20B. Ignition energy supply device 10 includes an ignition energy store 12, which is chargeable via a first charge circuit 14 from a first system voltage VUP to a reserve voltage VER. Ignition energy store 12 is suitable for providing a high ignition power in the range of 0.1 kW to 1.5 kW for at least one restraint means for a short time period of 0.5 ms to 2 ms. Back-up supply device 20A, 20B includes back-up energy store 22A, 22B, which is chargeable via a second charge circuit 24A, 24B from a first system voltage VUP, $U_B$, VAS to a back-up voltage VBup. Back-up energy store 22A, 22B has an energy density value higher than ignition energy store 12 by a factor of 10 to 50 and is suitable for providing the supply power in the range of 1 W to 10 W for the occupant protection system in the event of a supply interruption for a predefined time period of at least 5 s.

In the shown exemplary embodiments, ignition energy store 12 includes an aluminum electrolyte capacitor ER. Back-up energy store 22A includes four electric double layer capacitors EDLC1, EDLC2, EDLC3, EDLC4, and back-up energy store 22B includes five electric double layer capacitors EDLC1, EDLC2, EDLC3, EDLC4, EDLC5. Electric double layer capacitors EDLC1, EDLC2, EDLC3, EDLC4, EDLC5 have an energy density value higher by a factor of 10 to 50 compared to aluminum electrolyte capacitor ER. This higher energy density allows the autonomy times to be extended beyond 5 s compared to aluminum electrolyte capacitors, with the same volume requirement. It is also possible to expand the system functionality (sensor system, emergency functions, extended communication connection and the like) having a higher power requirement. In the shown exemplary embodiments, aluminum electrolyte capacitor ER is designed in such a way that it only provides the energy necessary for the activation of restraint means. This reduces the size of this energy store ER.

As is furthermore apparent from FIGS. 1 through 4, a vehicle voltage $U_B$ is applied to respective energy supply device 1A, 1B in the shown exemplary embodiments, and a polarity reversal-protected vehicle voltage VZP is provided downstream of a polarity reversal protection D1. Energy supply devices 1A, 1B each include a first voltage regulator block 9.1, which in a start-up phase provides internal analog and/or digital and switched voltages VI1, VI2, VI3 required for the circuits and assemblies of the occupant protection system from polarity reversal-protected vehicle voltage VZP. Moreover, a step-up converter 3 generates a constant first system voltage VUP, which is in the range of 20 V to 40 V and preferably has a value of 33 V, from different vehicle voltages $U_B$ or different polarity reversal-protected vehicle voltages VZP, which are in a voltage range of 6 V to 18 V. From this first system voltage VUP, aluminum electrolyte capacitor ER of ignition energy store 12 is charged in the shown exemplary embodiment. The charging takes place via first charge circuit 14. The charge current is programmable via a serial peripheral interface (SPI), which is not shown in greater detail. The first charge circuit may be activated or deactivated via a corresponding control signal $S_{CER}$. Moreover, first system voltage VUP is used to directly supply a step-down converter 5, which generates a lower second system voltage VAS in the range of 6.7 V to 7.5 V from first system voltage VUP. This second system voltage VAS is used to supply an external PSI standard sensor interface 7 and downstream further voltage regulators 9.2, 9.3, 9.4 for generating analog and/or digital supply voltages VI4, VI5, VI6 for communication interfaces, microcontrollers, ASICs and the like. Moreover, second system voltage VAS replaces polarity reversal-protected vehicle voltage VZP in the static operation as the supply voltage for first voltage regulator block 9.1.

In the event of a crash, energy is withdrawn directly from aluminum electrolyte capacitor ER of ignition energy store 12 via an ignition circuit 16 and a driver circuit 18 for activating the restraint means, which are not shown in greater detail. Depending on the system size, the power to be provided may be in the kilowatt range. A reserve voltage VER of 33 V output by aluminum electrolyte capacitor ER, and an ignition current of 2.5 A and, for example, sixteen squibs result in an ignition power to be provided of 1.32 kW.

Figure 4:
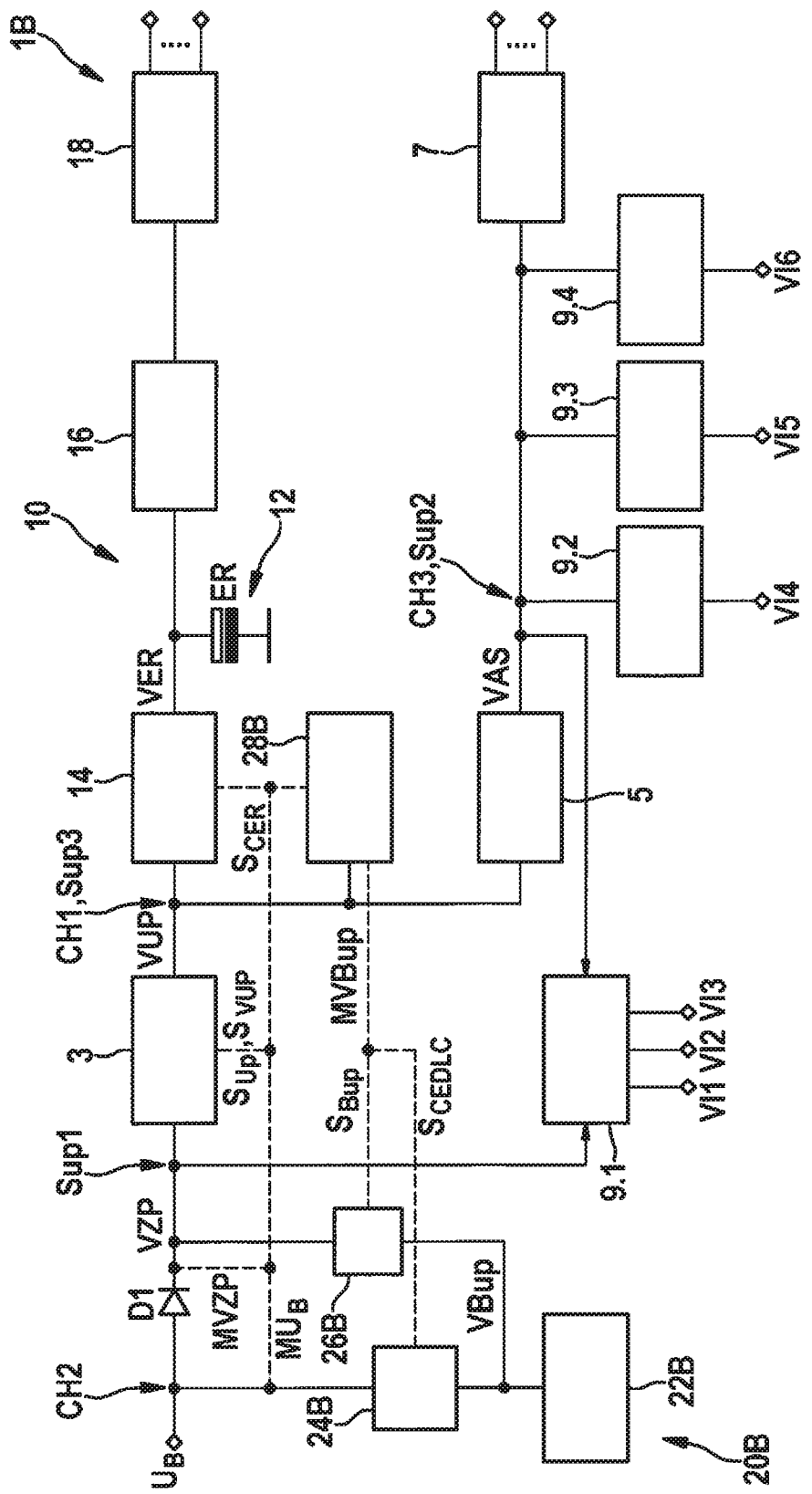
FIG. 4 shows a schematic block diagram of a second exemplary embodiment of an energy supply device according to the present invention for an occupant protection system.

As is furthermore apparent from FIGS. 1 and 4, theoretically there are multiple suitable charge points CH1, CH2, CH3 to which second charge circuit 24A, 24B may be connected for charging electric double layer capacitors EDLC1, EDLC2, EDLC3, EDLC4, EDLC5 of back-up energy store 22A, 22B. A first charge point CH1 and a second charge point CH2 are excellently suited for integrating back-up supply device 20A, 20B into an energy supply device 1A, 1B for an occupant protection system. Back-up supply device 20A, 20B may be designed discretely or as a supplement to an airbag supply ASIC or as a supplement to an airbag system ASIC. The advantage of first charge point CH1 is the unrestricted provision of the energy of back-up energy store 22A even with a continuously low vehicle voltage $U_B$ having a value of up to 6 V since first system voltage VUP is regulated to values of 20 V to 40 V by step-up converter 3 even with small input voltages. Moreover, first charge point CH1 is optimally suited for charging electric double layer capacitors EDLC1, EDLC2, EDLC3, EDLC4 of back-up energy store 22A with a limited charge current, while always maintaining electric double layer capacitors EDLC1, EDLC2, EDLC3, EDLC4 connected in series at their nominally permissible voltage, regardless of vehicle voltage $U_B$. Second charge point CH2 is also well-suited for charging electric double layer capacitors EDLC1, EDLC2, EDLC3, EDLC4, EDLC5 of back-up energy store 22B, but does not cover a permanent operation with a vehicle voltage $U_B$ of 6V. However, after the vehicle has been started, a charge voltage of more than 7 V may be reliably achieved for back-up energy store 22B. A third charge point CH3 is suitable for a back-up energy store including a maximum of three electric double layer capacitors. The usable supply energy is limited by the lower usable voltage swing of approximately 2.5 V.

As is furthermore apparent from FIGS. 1 and 4, there are multiple suitable feed points Sup1, Sup2, Sup3 for back-up energy store 22A, 22B in energy supply device 1A, 1B. A first feed point Sup1 and fed back-up voltage VBup, which corresponds to polarity reversal-protected vehicle voltage VZP, are suited the best. The usable voltage swing of back-up voltage VBup on back-up energy store 22A, 22B is at the maximum at first feed point Sup1. First feed point Sup1 optimizes the properties of back-up energy store 22A, 22B with a predefined number n of electric double layer capacitors EDLC1, EDLC2, EDLC3, EDLC4, EDLC5 having a nominal voltage in the range of 2.5 V to 2.7 V and the goal to connect preferably few electric double layer capacitors in series, so that the number n of electric double layer capacitors EDLC1, EDLC2, EDLC3, EDLC4, EDLC5 connected in series is between 3 and 6. Step-up converter 3 has the ability to generate and provide the first regulated system voltage VUP having a first selected value in the range of 20 V to 40 V necessary for optimally igniting the restraint means, or, for input voltages between 3 V and 5 V, the first regulated system voltage VUP having a second selected value in the range of 14 V to 18 V, from small input voltages in the range of at least 5 V, for the case of maintaining all system functions without or with limited activation of restraint means. In this way, first system voltage VUP having a value of 14 V to 18 V, for example, may only allow an operation of a limited number of typical ignition circuits, an external sensor system, an internal sensor system, a data storage unit, communications functions, emergency functions, and computing power. Furthermore step-up converter 3 may provide first regulated system voltage VUP at a third selected value in the range of 8 V to 10 V for the exclusive operation of the internal sensor system, the data storage unit, the communication functions, the emergency functions and the computing power. The step-up converter is also able to maintain this operating case for very small input voltages in the range of 1.5 V to 3 V. In the autonomy case or in the case of a supply interruption, back-up energy store 22A, 22B may decreasingly provide energy from its charge voltage only up to the minimally possible input voltage of step-up converter 3 in the range of 1.5 V to 5 V. A second feed point Sup2 and fed second system voltage VAS are suitable when the functions to be maintained only require a back-up voltage VBup of 3.3 V or less. In this case, a sufficient voltage swing of approximately 2.5 V is still present with four electric double layer capacitors EDLC1, EDLC2, EDLC3, EDLC4. A third feed point Sup3 is suitable for back-up energy stores including at least eight electric double layer capacitors for providing a back-up voltage VBup of more than 12 V from the start. In this way, all functions which are supplied from second system voltage VAS, such as external PSI sensors, external PSI sensor synchronization, downstream voltage regulators 9.1, 9.2, 9.3, 9.4 and the like, are functional.

Figure 2:
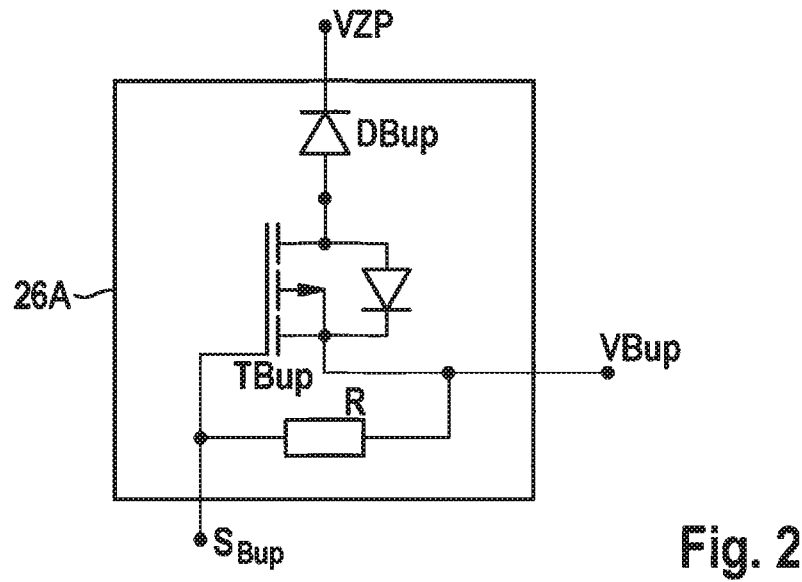
FIG. 2 shows a schematic circuit diagram of one exemplary embodiment of a back-up switch for an energy supply device according to the present invention for an occupant protection system from FIG. 1.
Figure 3:
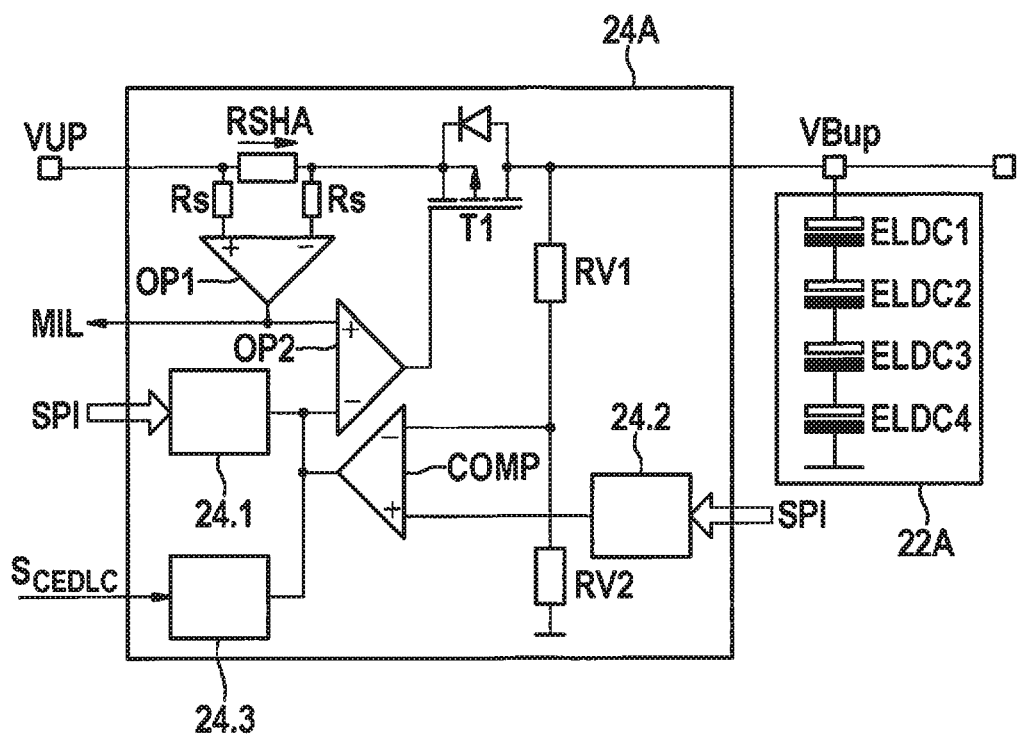
FIG. 3 shows a schematic circuit diagram of one exemplary embodiment of a second charge circuit for an energy supply device according to the present invention for an occupant protection system from FIG. 1.

As is furthermore apparent from FIGS. 1 through 3, a back-up energy store 22A including four electric double layer capacitors EDLC1, EDLC2, EDLC3, EDLC4 is optimally integrated into an adapted energy supply concept in the shown first exemplary embodiment of energy supply device 1A. Back-up energy store 22A is charged via the programmable second charge circuit 24A with superimposed voltage control proceeding from first charge point CH1. The configuration is designed for the use of non-selected electric double layer capacitors EDLC1, EDLC2, EDLC3, EDLC4 having an identical nominal capacitance in a series circuit. This is the most cost-effective system design. Since nominal capacitance Cn of electric double layer capacitors EDLC1, EDLC2, EDLC3, EDLC4 varies drastically (Cn+a %/=b %, where a=40, b=20) and the voltage of an electric double layer capacitor EDLC1, EDLC2, EDLC3, EDLC4 is not permitted to exceed maximum voltage value Uzmax of 2.5 V to 2.7 V, the following limiting values result for the superimposed voltage control according to equations (1) and (2):

$$Un=[(C-b\ \%)/Cvn]*Uzmax \quad (1)$$

$$Cvn=[(C+a\ \%)/(n-1)*(C-b\ \%)]/[(C+a\ \%)/(n-1)+(C-b\ \%)] \quad (2)$$

Here, Cvn is the overall capacitance of n capacitors connected in series having an identical nominal capacitance "C", of which n−1 capacitors in the worst case have the maximum capacitance ((C+a %)/(n−1)), and one capacitor has minimal capacitance C−b %. In the worst case, this state results in maximally permissible charge voltage Un of all n electric double layer capacitors EDLC1, EDLC2, EDLC3, EDLC4, having nominal capacitance C, connected in series during charging of minimal capacitance C−b % to maximum voltage value Uzmax. The superimposed voltage control of second charge circuit 24A is to be programmed to this maximally permissible charge voltage Un.

For example, an overall capacitance of Cv3=0.373*C and a charge voltage U3 of 5.79 V results for a maximum voltage value Uzmax of 2.7 V and a nominal capacitance C of 20 F, where a=40 and b=20, for n=3 electric double layer capacitors. Taking a 3% tolerance of the voltage control into consideration, a value of U3=5.6 V applies for the charge voltage.

For n=4 electric double layer capacitors, an overall capacitance of Cv4=0.295*C and a charge voltage U4 of 7.32 V result. Taking a 3% tolerance of the voltage control into consideration, a value of U4=7.1 V applies for the charge voltage.

For n=5 electric double layer capacitors, an overall capacitance of Cv5=0.243*C and a charge voltage U5 of 8.89 V result. Taking a 3% tolerance of the voltage control into consideration, a value of U5=8.6 V applies for the charge voltage.

For n=6 electric double layer capacitors, an overall capacitance of Cv6=0.207*C and a charge voltage U6 of 10.4 V result. Taking a 3% tolerance of the voltage control into consideration, a value of U6=10.1 V applies for the charge voltage.

For n=7 electric double layer capacitors, an overall capacitance of Cv7=0.181*C and a charge voltage U7 of 11.96 V result. Taking a 3% tolerance of the voltage control into consideration, a value of U7=11.6 V applies for the charge voltage.

For n=8 electric double layer capacitors, an overall capacitance of Cv8=0.16*C and a charge voltage U8 of 13.5 V result. Taking a 3% tolerance of the voltage control into consideration, a value of U8=13.1 V applies for the charge voltage.

In the shown exemplary embodiment, the superimposed voltage control is designed in such a way that the voltage control is set to the permissible maximum value via an SPI programming, corresponding to the number (n) of electric double layer capacitors connected in series, having an identical nominal capacitance. This value ensures that the capacitance tolerances of the electric double layer capacitors connected in series do not cause any electric double layer capacitor to receive more than the maximally permissible cell voltage Uzmax during charging of back-up energy store 22A.

Furthermore, an evaluation and control unit 28A is provided which, as a function of voltages $U_B$, VZP or measuring signals $MU_B$, MVZP, feeds the behavior of step-up converter 3, of first charge circuit 14, of second charge circuit 24A and the feed of the back-up energy of back-up energy store 22A via a back-up switch 26A, which includes a back-up transistor TBup, a protective diode DBup and an ohmic resistor R, into first feed point Sup1. Measuring signals $MU_B$, MVZP may be tapped, for example, by protective resistors, which are not shown in greater detail, protecting evaluation and control unit 28A in particular against voltage transients of the vehicle electrical system. Protective diode DBup ensures that no unlimited current is able to flow directly from the vehicle electrical system into back-up energy store 22A and damage it. Electric double layer capacitors EDLC1, EDLC2, EDLC3, EDLC4 have only certain permissible charge and discharge currents. In the shown exemplary embodiment, selected electric double layer capacitors EDLC1, EDLC2, EDLC3, EDLC4 have at least one discharge current in the range of 1 A to 2 A and a charge current of up to 200 mA.

Table 1 shows the relationships for a meaningful control of the above-mentioned blocks.

TABLE 1

| $U_B$ | VZP [V] | BL3 | VUP [V] | BL14 | BL24A | TBup |
|---|---|---|---|---|---|---|
| >6 V | X | On | 33 | On | On | Off |
| <6 V | >5 | On | 33 | On | Off* | On* |
| <6 V | ]3.5[ | On | 14 | On | Off* | On* |
| <6 V | ]1.5, 3[ | On | 8 | Off | Off* | On* |
| <6 V | <1.5 V | Off | X | Off | Off | Off |

In detail, the following applies in the shown first exemplary embodiment:

If vehicle voltage $U_B$, and thus the supply voltage of energy supply device 1A, is more than 6V, a continuous operation is present. Step-up converter 3 is thus released and generates first system voltage VUP in the shown exemplary embodiment with a value of 33 V. First charge circuit 14 and second charge circuit 24A are also released and are subject to the control of evaluation and control unit 28A for the maximum charge currents, which may be selected as a function of system criteria. The back-up path of back-up energy store 22A to first feed point Sup1 is blocked. This means that back-up transistor TBup is switched to a blocking state. Step-up converter 3 may be activated and/or deactivated via a control signal $S_{UP}$, output voltage VUP being predefined via a control signal $S_{VUP}$.

If vehicle voltage $U_B$ collapses to a value below 6 V, or if a supply interruption or a short circuit results in the vehicle battery, and the like, due to a crash, a back-up energy supply takes place with the aid of back-up energy store 22A, and back-up transistor TBup is controlled to a conducting state. Moreover, the charging of back-up energy store 22A from second system voltage VUP is blocked. As long as back-up energy store 22A generates a polarity reversal-protected vehicle voltage VZP of more than 5 V, no limitation of the supply of the occupant protection system occurs. The occupant protection system is supplied by first system voltage VUP, and ignition energy store 12 is recharged if restraint means were already activated therefrom.

If polarity reversal-protected vehicle voltage VZP drops to a value below 5 V due to the energy withdrawal from back-up energy store 22A, the output voltage of step-up converter 3 or second system voltage VUP is regulated to a value of 14 V, for example, to prevent the input current into step-up converter 3 from becoming too large or to maintain the efficiency of step-up converter 3 at a high level. While recharging of ignition energy store 12 is still possible with the lower second system voltage VUP of 14 V, the reduced voltage level only allows typical ignition processes. All other control unit functions, however, remain possible without restrictions.

If polarity reversal-protected vehicle voltage VZP drops below a value of 3V, the output voltage of step-up converter 3 or second system voltage VUP is further reduced to a value of 8 V, for example, to prevent the input current into step-up converter 3 from becoming too large or to maintain the efficiency of step-up converter 3 at a high level. At the same time, first charge circuit 14 is blocked since low second system voltage VUP does not represent a sufficient effective voltage for activating ignition circuits. All other control unit functions, except for the communication with PSI sensors, remain possible without restrictions.

If polarity reversal-protected vehicle voltage VZP drops below a value of 1.5 V, the back-up energy supply is terminated, and back-up transistor TBup is switched to a blocking state so as not to generate negative cell voltages in electric double layer capacitors EDLC1, EDLC2, EDLC3, EDLC4. Moreover, it is too complex for step-up converter 3 to generate an output voltage of 10 V from an input voltage of less than 1.5 V with reasonable efficiencies.

Moreover, the back-up control may be improved if the commands marked with an * in Table 1 are combined with a minimum time of 50 ms, for example, to avoid multiple switching processes in the event of a collapse of vehicle voltage $U_B$ below the voltage value of 6 V. In this way, interferences on vehicle voltage $U_B$ may advantageously be filtered.

In the most unfavorable case, the shown first exemplary embodiment allows an autonomy time or a back-up energy supply of up to 57 s to be achieved.

FIG. 3 shows a slightly more detailed representation of the SPI-programmable second charge circuit 24A including an SPI-programmable voltage limitation and a switch-on/switch-off control via a control signal $S_{CEDLC}$.

The charge current for back-up energy store 22A is converted into a differential voltage by a shunt resistor RSHA. This is amplified by a non-inverting first amplifier OP1 and supplied to a second amplifier OP2 as input voltage at the non-inverting input. In the shown exemplary embodiment, two protective resistors Rs are provided, which are also used for the absolute offset level reduction of first amplifier OP1. If this differential voltage is greater than a reference voltage of a reference voltage source 24.1 predefinable by an SPI programming at the inverting input of the second amplifier, an output voltage at second amplifier OP2 increases and controls a regulating transistor T1 designed as a p-channel FET toward a non-conducting state, so that the charge current drops to the programmed reference value. The output voltage of first amplifier OP1 may be read back with the aid of an analog-to-digital converter via the SPI as measuring signal MIL for control of the charge current level of back-up energy store 22A.

The charge voltage of back-up energy store 22A is supplied via a voltage divider Rv1, Rv2 to an inverting input of a comparator COMP. Since, in the shown exemplary embodiment, four electric double layer capacitors EDLC1, EDLC2, EDLC3, EDLC4 are connected in series, a maximum back-up voltage VBupmax is programmed to U4=7.1 V via the SPI, so that no electric double layer capacitor EDLC1, EDLC2, EDLC3, EDLC4 is destroyed due to the capacitance tolerance of the n identical nominal capacitances of back-up energy store 22A. If eight electric double layer capacitors EDLC1 through EDLC8 having an identical nominal capacitance and design are connected in series, a maximum back-up voltage VBupmax=13.1 V is programmed via the SPI, so that no electric double layer capacitor EDLC1 through EDLC8 of the series circuit has a voltage above the permissible cell voltage Uzmax (for example=2.7 V) due to the capacitance tolerance of the n identical nominal capacitances of back-up energy store 22A. If the voltage present at the inverting input of comparator COMP exceeds a programmed setpoint specification generated via a reference voltage source 24.2 at the non-inverting input of comparator COMP, an open collector output of comparator COMP is connected to ground in a conducting manner and, via the reduction of the voltage at the inverting input of second amplifier OP2, ensures a blockage of regulating transistor T1. Moreover, an open collector at the output of a driver 24.3 may be connected to ground in a conducting manner via a "LOW" logic level of control signal $S_{CEDLC}$. In this way, regulating transistor T1 is blocked via the reduction of the voltage at the inverting input of second amplifier OP2. With a "HIGH" logic level of control signal $S_{CEDLC}$, the open collector at the output of driver 24.3 remains blocked, and second charge circuit 24A is released.

The illustrated exemplary embodiment of energy supply device 1A has the advantage that, in contrast to ignition energy store 12, back-up energy store 22A itself does not need to be accommodated in the immediate vicinity of the occupant protection system. Since the charge currents are not very high (0 to 200 mA) and the discharge currents are not very high (0 to 2 A), back-up energy store 22A may be accommodated in suitable installation locations at a larger distance from the occupant protection system, without using larger cable cross-sections.

Figure 5:
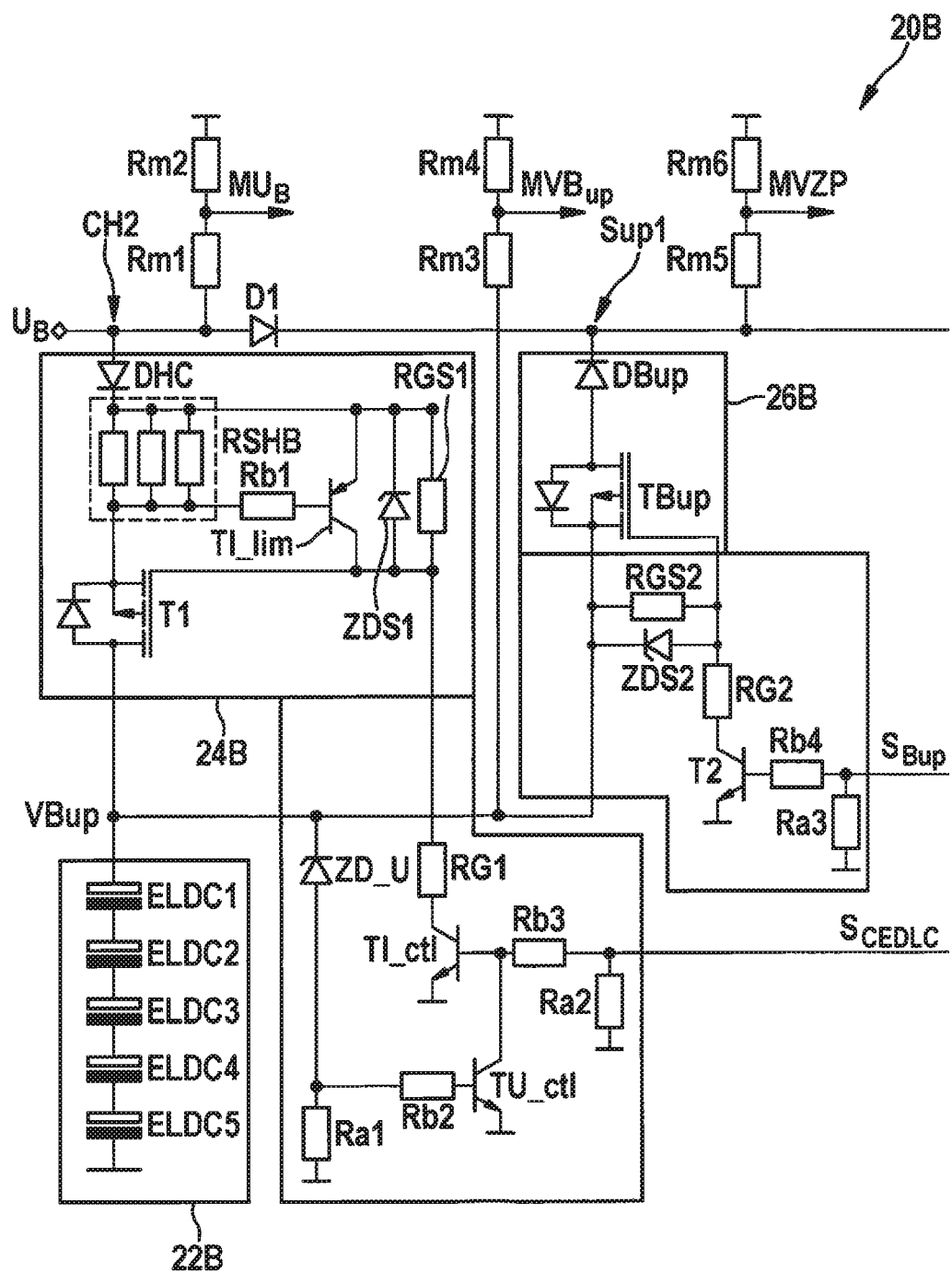
FIG. 5 shows a schematic circuit diagram of one exemplary embodiment of a back-up supply device for an energy supply device according to the present invention for an occupant protection system from FIG. 4.

As is furthermore apparent from FIGS. 4 and 5, a back-up energy store 22B in the shown second exemplary embodiment of energy supply device 1B is also designed with four electric double layer capacitors EDLC1, EDLC2, EDLC3, EDLC4, EDLC5, analogously to the first exemplary embodiment. In contrast to the first exemplary embodiment, back-up energy store 22B in the shown second exemplary embodiment is charged via second charge circuit 24B proceeding from second charge point CH2. Analogously to the first exemplary embodiment, the back-up energy is fed at first feed point Sup1.

FIG. 5 shows a discrete design of back-up supply device 20B. Back-up energy store 22B is charged with a charge current from vehicle voltage $U_B$ via a protective diode DCH, a shunt resistor RSHB and a regulating transistor T1. A first transistor TI_lim assumes the limitation of the charge current. The level of the limitation is essentially set by shunt resistor RSHB. Switching on and off of the charge current takes place via a second transistor TI_ctl. If control signal $S_{CEDLC}$ has a "HIGH" logic level, second transistor TI_ctl is controlled to a conducting state via a base resistor Rb3. In this way, a voltage potential is set at the gate of regulating transistor T1 designed as a p-channel MOSFET by a voltage divider made up of resistors RGS1, RG1 in such a way that regulating transistor T1 is conducting. The charge current for back-up energy store 22B is detected and limited via shunt resistor RSHB as soon as an emitter base voltage of first transistor TI_lim controls it to a conducting state, and the gate potential of regulating transistor T1 increases again, whereby it becomes slightly more high-resistance again. A first Zener diode ZDS1 situated in parallel to resistor RGS1 is only used to protect regulating transistor T1 and to limit the source gate voltage at high vehicle voltages $U_B$.

The task of charge voltage limitation is assumed by a second Zener diode ZD_U, together with resistors Ra1, Rb2 and a third transistor TU_ctl. If the charge voltage of back-up energy store 22B exceeds a value which is formed of a Zener voltage of second Zener diode ZD_U and a third base emitter voltage of third transistor TU_ctl, third transistor TU_ctl is switched to a conducting state and blocks second transistor TI_ctl, whereby the charging process of back-up energy store 22B is stopped until back-up voltage VBup of back-up energy store 22B drops below the above-mentioned threshold value again due to self-discharge (leakage currents).

The back-up energy from back-up energy store 22B is fed via back-up transistor TBup designed as a p-channel MOSFET and protective diode DBup at first feed point Sup1. The control is carried out by a control signal $S_{Bup}$ via a fourth transistor T2. If control signal $S_{Bup}$ has a "HIGH" logic level, fourth transistor T2 is controlled to a conducting state via a base resistor Rb4. As a result, a voltage potential is set at the gate of back-up transistor TBup by the voltage divider made up of resistors RGS2, RG2 in such a way that it is conducting. Back-up energy store 22B thus supplies the supply current of the occupant protection system at first feed point Sup1, if vehicle voltage $U_B$ is too low or interrupted. With the aid of the measuring voltage dividers made up of resistors Rm1, Rm2 or Rm3, Rm4 or Rm5, Rm6, an analog-to-digital converter of evaluation and control unit 28B detects voltages $U_B$, VZP, VBup required for controlling back-up energy store 22B as measuring signals $MU_B$, MVBup, MVZP and generates therefrom the corresponding control signals $S_{CEDLC}$, $S_{Bup}$, $S_{CER}$ indicated in Table 2.

TABLE 2

| $U_B$ | VZP [V] | BL 3 | BL 14 | BL 24B | TBup |
|---|---|---|---|---|---|
| >6 V | X | On | On | On | Off |
| <6 V | >5 | On | On | Off* | On* |
| <6 V | <5 | Off | On** | Off | Off |

Moreover, the back-up control may be improved if the commands marked with an * in Table 2 are combined with a minimum time of 50 ms, for example, to avoid multiple switching processes in the event of a collapse of vehicle voltage $U_B$ below the voltage value of 6 V. The command marked with two ** in Table 2 remains active until reset.

What is claimed is:

1. An energy supply device for an occupant protection system, comprising:
   an ignition energy supply device;
   a first charge circuit receiving a first system voltage, wherein:
      the ignition energy supply device includes an ignition energy store that is chargeable via the first charge circuit from the first system voltage to a reserve voltage, and
      the ignition energy store provides a high ignition energy in a range of 0.1 kW to 2.5 kW for at least one restraint arrangement for a short time period of 0.5 ms to 2 ms;
   a step-up converter that converts an input voltage to the first system voltage;
   a back-up supply device; and
   a second charge circuit, wherein:
      the back-up supply device includes a back-up energy store that is chargeable via the second charge circuit from a second system voltage to a back-up voltage, and
      the back-up energy store has an energy density at least 10 to 50 times greater than that of the ignition energy store, and provides a supply energy in the range of 1 W to 10 W for the occupant protection system in the event of a supply interruption for a predefined time period of at least 5 s.

2. The energy supply device as recited in claim 1, wherein the ignition energy store includes at least one aluminum electrolyte capacitor.

3. The energy supply device as recited in claim 1, wherein the back-up energy store includes at least one electric double layer capacitor.

4. The energy supply device as recited in claim 3, wherein the back-up energy store includes at least one of:
   at least two electric double layer capacitors connected in series, or
   at least two electric double layer capacitors connected in parallel.

5. The energy supply device as recited in claim 1, further comprising a step-down converter that converts the first system voltage into a lower output voltage that corresponds to the second system voltage.

6. The energy supply device as recited in claim 5, further comprising at least one voltage regulator that regulates the second system voltage to an internal supply voltage.

7. The energy supply device as recited in claim 1, further comprising an evaluation and control unit that sets at least one of:
   a first charge current for the ignition energy store via the first charge circuit as a function of at least one piece of system information, or
   a second charge current for the back-up energy store via the second charge circuit as a function of the at least one piece of system information.

8. The energy supply device as recited in claim 1, further comprising:
   an evaluation and control unit that sets at least one of:
      a conversion factor of the step-up converter as a function of at least one piece of system information, or
      a level of the first system voltage as a function of the at least one piece of system information.

9. The energy supply device as recited in claim 8, wherein the at least one piece of system information includes at least one of:
   a piece of information about an instantaneous value of a vehicle voltage,
   a piece of information about an instantaneous value of a polarity reversal-protected vehicle voltage,
   a piece of information about an instantaneous value of the first system voltage, or
   a piece of information about an instantaneous value of the back-up voltage.

10. The energy supply device as recited in claim 1, wherein one of:
the second charge circuit is connected at a first charge point to the first system voltage,
the second charge circuit is connected at a second charge point to a vehicle voltage, or
the second charge circuit is connected at a third charge point to the second system voltage.

11. The energy supply device as recited in claim 1, wherein in the event of a supply interruption the back-up energy store provides one of:
a polarity reversal-protected vehicle voltage at a first feed point,
the second system voltage at a second feed point, or
the first system voltage at a third feed point.

12. The energy supply device as recited in claim 11, further comprising an evaluation and control unit that connects the back-up energy store via a back-up switch to a corresponding feed point as a function of at least one piece of system information.

* * * * *